Patented Jan. 4, 1927.

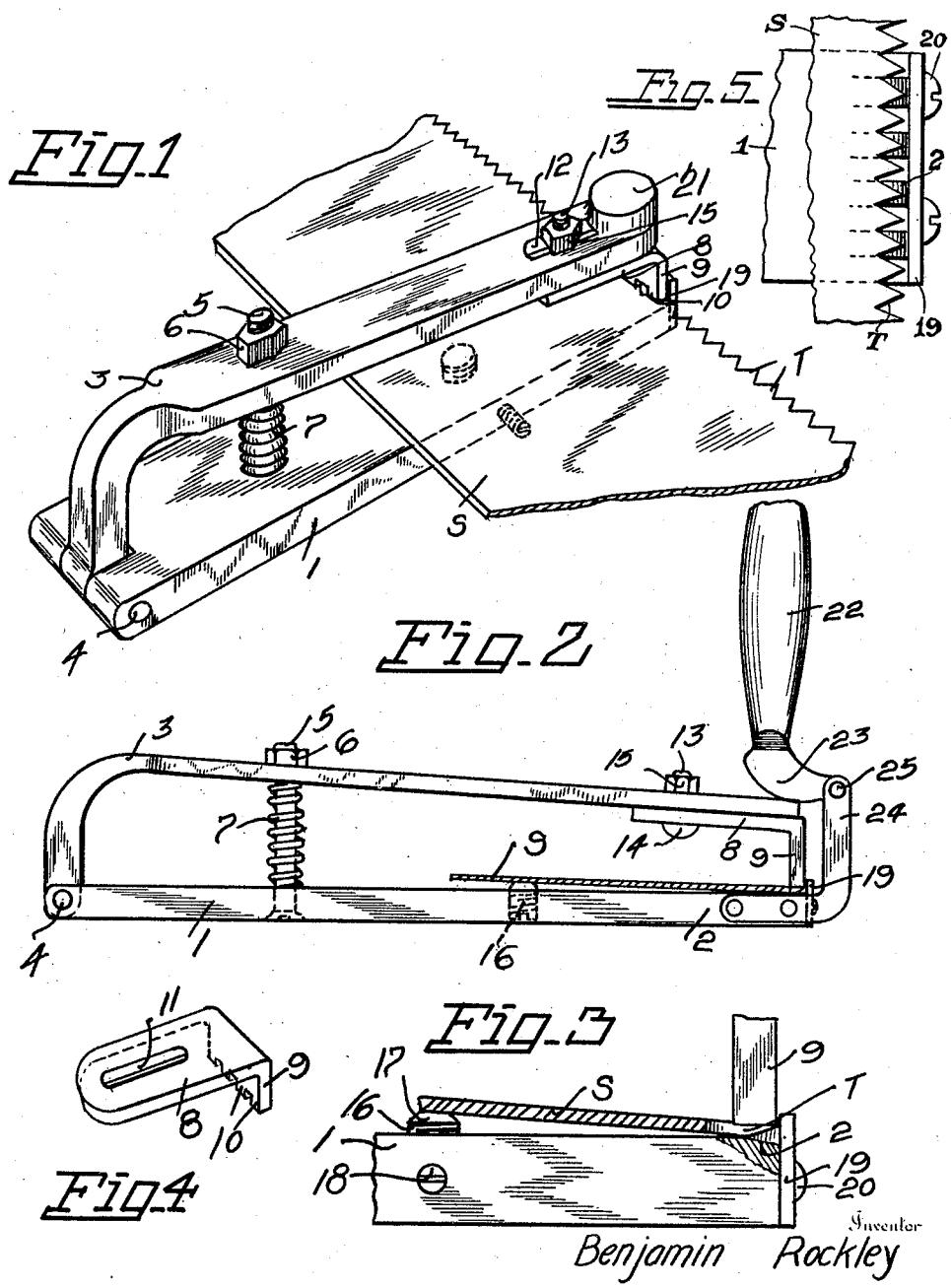

1,613,199

UNITED STATES PATENT OFFICE.

BENJAMIN ROCKLEY, OF NORTHPORT, WASHINGTON.

SAW SET.

Application filed June 23, 1924. Serial No. 721,683.

My present invention relates to an improved saw set of the hand operated type designed especially for use in settitng the teeth of straight edge saws, and adapted to spread the teeth laterally of the saw and regulate the width of the kerf cut by the saw. The device is adapted to engage and set a number of teeth simultaneously and uniformly, thus reducing the time and labor usually expended in properly setting and alining saws.

The primary object of the invention is the provision of a manually operated device of this character using either a hammer-blow pressure or pressure secured from a manually actuated cam-lever for imparting the correct angle of the teeth with relation to the saw blade, which device is inexpensive in cost of manufacture, is simple in construction, and may be operated with facility in the performance of its functions.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention. The invention as illustrated is a manually operated tool and the drawings show one form of the device for actuation by a hammer-blow while another form is also illustrated employing a cam-lever for imparting the required pressure in setting the teeth of the saw.

Figure 1 is a perspective view of the device adapted for use with a hammer-blow, and showing the correct operative relation of the setting tool and saw.

Figure 2 is a view in side elevation of the device showing the saw in section and illustrating a cam-lever for actuating the device.

Figure 3 is an enlarged detail view showing the anvil and adjustable support thereon for the saw.

Figure 4 is a detail perspective view of the setting tool, detached.

Figure 5 is a detail plan view showing the relation of the saw teeth to the anvil.

The metal base plate 1 is of suitable size and shape for use in horizontal position on a bench or table, and its end 2 is adapted for use as an anvil for the teeth T of the saw S.

An angular arm 3 is pivoted at one end as indicated at 4 to the base plate and projects over the top of the plate toward the anvil end of the plate. The arm is adapted to be depressed for a working stroke of the tool, and the arm which is slotted for the purpose is guided on the bolt 5 which has its head fixed in the base plate and projects through the slotted arm. A nut 6 above the arm is threaded on the bolt to adjust the tension of a spring 7 which is interposed between the arm and plate for the purpose of returning the arm or lifting it after each working stroke of the device.

At its free end the pivoted, spring pressed arm carries a setting tool 8 in the form of an angle plate and including a flange 9 fashioned with spaced teeth 10 on its edge, said teeth being spaced at intervals and adapted to engage or seat on the tops of a number of the saw teeth to be set. The setting tool has a longitudinal slot 11 corresponding to a complementary slot 12 in the arm, and the bolt 13 which passes through these slotted members, has a head 14 bearing against the underside of the setting-tool, and a nut 15 bearing against the top face of the arm. The setting tool may thus be moved longitudinally of the arm and clamped in adjusted position for engagement with different sizes of saw teeth T.

The saw blade S is supported on the base plate below the arm with its teeth T resting on the anvil portion 1 of the plate, and the rear or back edge of the saw blade is directly supported by means of an adjustable bolt 16 threaded upwardly through a bolt hole in the base plate, and provided with a head 17 which projects above the top face of the base plate. By turning the bolt the distance of the top of the head above the top of the base plate may be varied, and when the required position is secured the bolt may be retained against turning by a set screw 18 in the base plate. The height of the projecting head determines the inclination of the blade resting upon it and the inclination of the blade determines the degree of angularity imparted to the saw teeth which rest on the flat anvil.

A vertically disposed guide plate 19 is fixed by screws 20 at the front end of the anvil, and the plate projects above the anvil top to act as a gage for the toothed edge of the saw blade which is pressed against the gage.

In Figure 1 of the drawings I illustrate a striking head 21 on the front free end of the pivoted arm, and it will be apparent that a blow on the striking head from a hammer will depress the free end of the arm and the setting-tool with it causing impact of the teeth of the setting tool with the complementary teeth of the saw. This impact of the setting tool on the saw teeth "sets" the teeth uniformly and at the desired angle to the saw blade. Before a succeeding blow is struck the saw blade is moved longitudinally the distance of a saw tooth to present alternating saw teeth to the teeth of the setting tool. Another hammer blow on the striking head sets these saw teeth, and then the saw is moved longitudinally the distance corresponding to the number of teeth on the setting head. The saw teeth are thus set by co-action of the setting tool and the anvil between which members the saw teeth are located.

In Figure 2 a hand lever 22 is illustrated for actuating the pivoted arm and setting tool on the working stroke. This lever has a cam member 23 which is adapted to bear on the free end of the arm and depress the latter. The cam lever is pivoted on a bracket 24, the pivot being indicated at 25, and the bracket is secured in suitable manner or fixed at the front end of the anvil.

After each stroke of the setting tool the spring 7 lifts the arm and setting tool to operative position for a succeeding stroke, and this release of the setting tool from the saw-teeth permits the movement of the saw blade as required.

It will thus be apparent that the device may be manipulated with facility and accuracy in the performance of its functions, and by adjusting the supporting bolt 16 to tilt the sawblade resting thereon the teeth may be set to various degrees of angularity. The setting tool may be adjusted for various depths of saw teeth, and if required interchangeable setting tools may be used on the arm to adapt the tool for use with saw teeth of various widths.

Having thus fully described my invention, what I claim as new and desire to secure by Letters Patent is—

The combination with an anvil plate having a vertically adjustable saw support and a fixed guide plate, of a depressible, spring pressed arm pivoted on said anvil plate, and an adjustable setting tool carried at the free end of the arm comprising a slotted plate having a series of spaced teeth and a bolt for securing said setting tool in adjusted position on the arm.

In testimony whereof I affix my signature.

BENJAMIN ROCKLEY.